(12) United States Patent
Loccisano et al.

(10) Patent No.: US 12,098,697 B2
(45) Date of Patent: Sep. 24, 2024

(54) METHOD AND APPARATUS FOR CONSTRUCTING A RINGED AIRFOIL

(71) Applicants: Vincent Loccisano, Wellesley, MA (US); William Scott Keeley, Charlestown, RI (US)

(72) Inventors: Vincent Loccisano, Wellesley, MA (US); William Scott Keeley, Charlestown, RI (US)

( * ) Notice: Subject to any disclaimer, the term of this patent is extended or adjusted under 35 U.S.C. 154(b) by 0 days.

(21) Appl. No.: 18/440,364

(22) Filed: Feb. 13, 2024

(65) Prior Publication Data

US 2024/0271593 A1 Aug. 15, 2024

Related U.S. Application Data

(60) Provisional application No. 63/484,651, filed on Feb. 13, 2023.

(51) Int. Cl.
*F03D 1/04* (2006.01)
*F01D 5/14* (2006.01)

(52) U.S. Cl.
CPC ............... *F03D 1/04* (2013.01); *F01D 5/141* (2013.01); *F05D 2240/303* (2013.01); *F05D 2240/304* (2013.01); *F05D 2260/22141* (2013.01); *F05D 2300/612* (2013.01)

(58) Field of Classification Search
CPC . F03D 1/04; F03D 1/041; F03D 1/042; F03D 1/044; F05B 2240/11; F05B 2240/914; F01D 5/141; F05D 2240/303; F05D 2240/304; F05D 2260/22141; F05D 2300/612
See application file for complete search history.

(56) References Cited

U.S. PATENT DOCUMENTS

| | | | | |
|---|---|---|---|---|
| 6,082,667 A * | 7/2000 | Haggard | ............... | B64C 3/30 |
| | | | | 244/35 R |
| 8,317,469 B2 * | 11/2012 | Kinzie | .................. | F03D 1/04 |
| | | | | 415/211.2 |
| 8,393,850 B2 * | 3/2013 | Werle | .................... | F03D 1/04 |
| | | | | 416/85 |
| 9,228,564 B2 * | 1/2016 | Wirz | ..................... | F03D 3/062 |
| 9,581,040 B2 * | 2/2017 | Minola | .................. | F03D 1/04 |
| 2005/0069415 A1 * | 3/2005 | Ferracani | ............. | F03D 1/04 |
| | | | | 416/132 B |
| 2010/0284802 A1 * | 11/2010 | Presz, Jr. | ............ | F03D 13/20 |
| | | | | 415/182.1 |

* cited by examiner

*Primary Examiner* — Sang K Kim

(57) ABSTRACT

A shrouded fluid turbine comprises annular airfoils (called shrouds) that are coaxial with and surround a rotor of a fluid turbine. A Mixer Ejector Wind Turbine consists of a turbine shroud that is engaged with a rotor. The rotor is rotationally engaged with a nacelle that houses electrical-generation equipment. The turbine shroud is engaged with support members that are engaged with an ejector shroud. At least one inflated annular tube is surrounded by an annular array of support members, which in turn is covered by a membrane, forming the annular airfoils that make up the turbine shroud and ejector shroud.

14 Claims, 12 Drawing Sheets

METHOD AND APPARATUS FOR CONSTRUCTING A RINGED AIRFOIL

TECHNICAL FIELD

The present disclosure relates to fluid turbine shrouds of a particular structure, and to shrouded fluid turbines incorporating such shrouds.

BACKGROUND OF THE INVENTION

A shrouded turbine or diffuser-augmented turbine is a fluid turbine with a rotor that is surrounded by an annular duct, shroud, diffuser, or cowling. Ringed airfoils/shrouds are known to improve mass flow through a rotor. By diffusing and expanding a wake, a shroud increases wake-area size, reducing its pressure. This enables increased mass flow and greater power extraction at the rotor. A drawback of shrouds is their added weight. Turbine shrouds are commonly constructed of rigid, fiber-reinforced polymers, making them heavy, requiring substantial tower structures to support their weight. A side gust impacts them like a bluff body. This force strains the turbine's tower and other structural components. The problem increases with large rotor-swept areas requiring large shrouds. To withstand forces like side gusts, shrouds may be constructed of relatively light, flexible materials.

Fluid turbines may be used to extract energy from fluids such as air (i.e. wind) or water. The aerodynamic principles of a mixer ejector wind turbine also apply to hydrodynamic principles of a mixer ejector water turbine.

SUMMARY OF THE INVENTION

In an example embodiment, a shrouded fluid turbine has annular airfoils (referred to as shrouds) which are coaxial with and surround a rotor of a fluid turbine. A Mixer Ejector Wind Turbine has a turbine shroud that is engaged with a rotor and with a secondary shroud, referred to as an ejector shroud, located downstream from the turbine shroud. The rotor is rotationally engaged with a nacelle that houses electrical-generation equipment. The turbine shroud is engaged with support members, which are engaged with an ejector shroud. One skilled in the art understands that construction methods used to form an ejector shroud may also be used to form a turbine shroud. For clarity, ejector shroud construction is demonstrated understanding that turbine shrouds may be constructed in a manner within the scope of the invention.

In an example embodiment, an annular array of inflated annular tubes is surrounded by an annular array of ribs the combination of which is in turn covered by a membrane. Annular tubes may be filled with a compressed gas. In some embodiments the compressed gas is air. In some embodiments the inflated annular tubes are textile structures, the textile material may also be impregnated with a polymer. Ribs are structural elements arranged in a chordwise direction, extending from the leading edge to the trailing edge of the airfoil that makes up the ringed airfoil. The membrane surface may be adhered to a tangent surface on the annular inflated tube(s) or may be adhered to the exterior surface of each rib in the array of ribs. A tangent surface may also be thought of as an array of tangent points along an inflated annular tube. Together these form an annular airfoil referred to as a shroud.

A separate embodiment is made up of coaxial inflated annular tubes with spacers holding an inner inflated annular tube coaxial with an outer inflated annular tube. In some embodiments the spacers are permeable and allow airflow between spaces created by multiple spacers. One skilled in the art understands that permeable spacers may allow air to flow about the inflated annular tube so as to equalize pressure between compartmentalized sections between spacers.

In other embodiments, inflated annular tubes are reinforced with helically wrapped fibrous material. Fibrous material may be formed into a cable. Cables wrapped helically about the inflated annular tubes provide structural reinforcement and may be embedded in the annular tube surface material or adhered to it. In other embodiments a material having a rectangular cross section forms a band. Helically wrapped bands function as a spacer to hold coaxial inflated annular tubes spaced coaxially. Helically wrapped bands may be permeable to allow even flow of compressed gas about the annular tube.

In yet other embodiments the inflated annular tubes are filled with foam in place of compressed gas.

DETAILED DESCRIPTION

Figure 1:
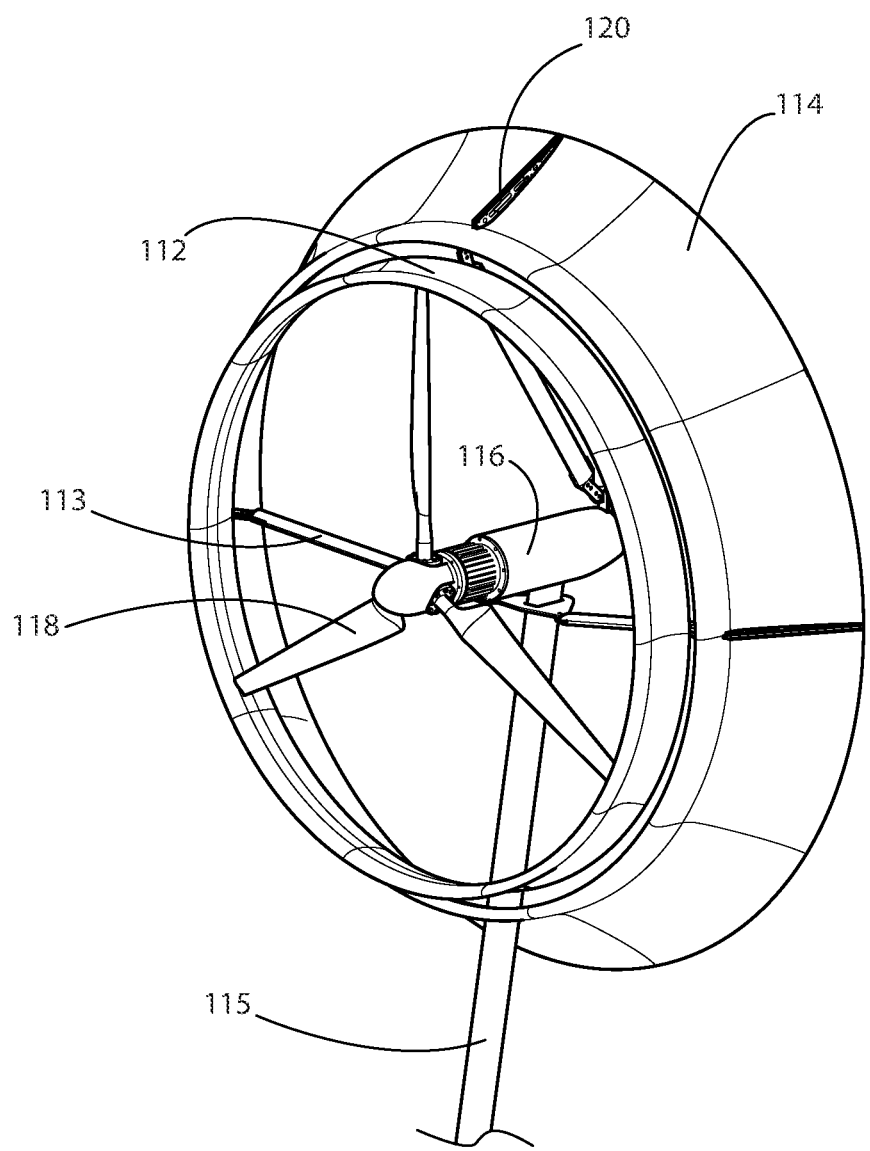
FIG. 1 is a front perspective view of a Mixer Ejector Wind Turbine with inflated textile structures supporting shrouds.

FIG. 1 illustrates a Mixer Ejector Wind Turbine 100 that comprises a turbine shroud 112 which is engaged with rotor 118. The rotor 118 is rotationally engaged with a nacelle 116 that houses electrical generation equipment. The turbine shroud is engaged with support members 113 that are engaged with an ejector shroud 114. The MEWT is supported by a tower structure 115.

Figure 2:
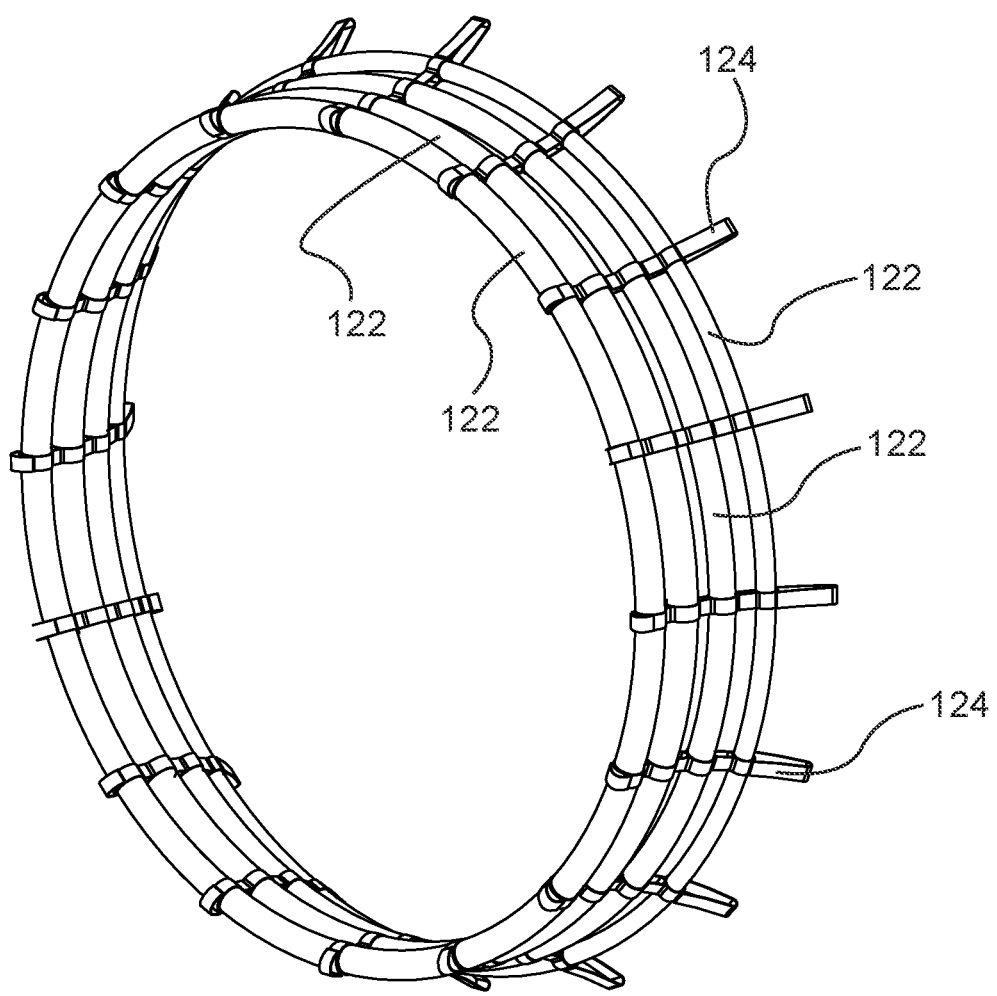
FIG. 2 is a front perspective view of an internal structure of an ejector portion of a mixer ejector wind turbine thereof.
Figure 3:
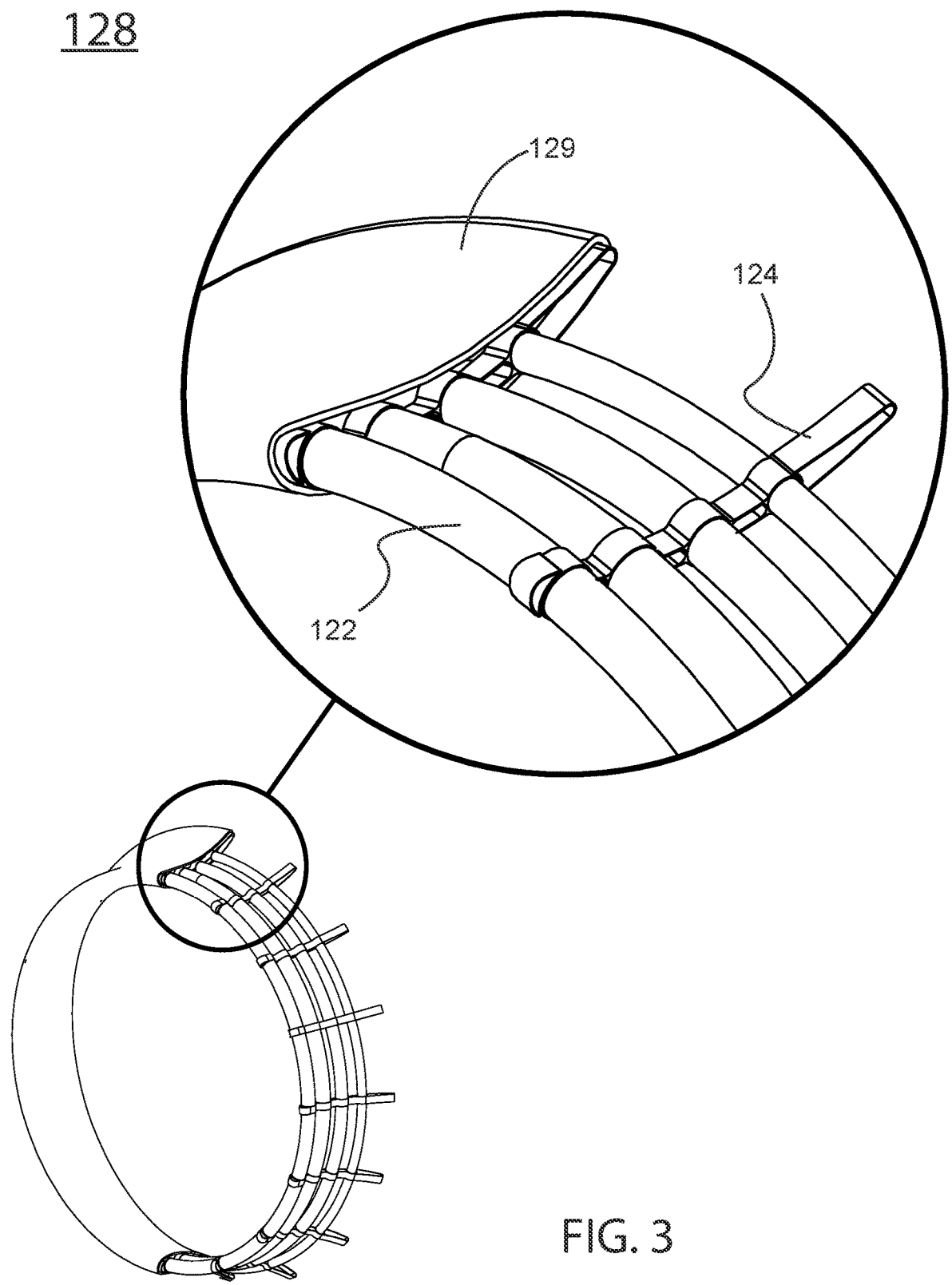
FIG. 3 is a front, perspective, detail view of the internal structure of an ejector thereof.
Figure 4:
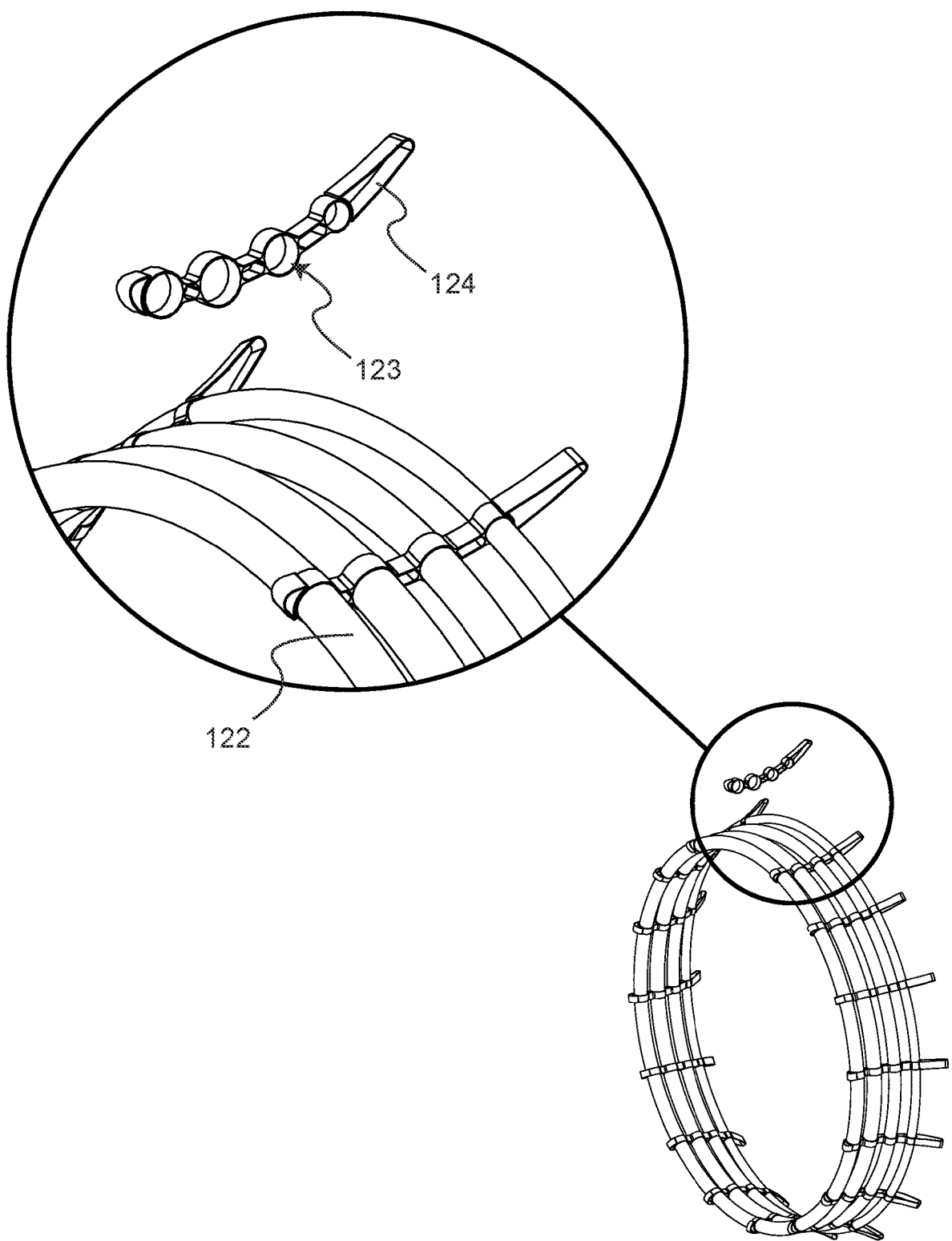
FIG. 4 is an exploded view of the internal structure of an ejector thereof.
Figure 5:
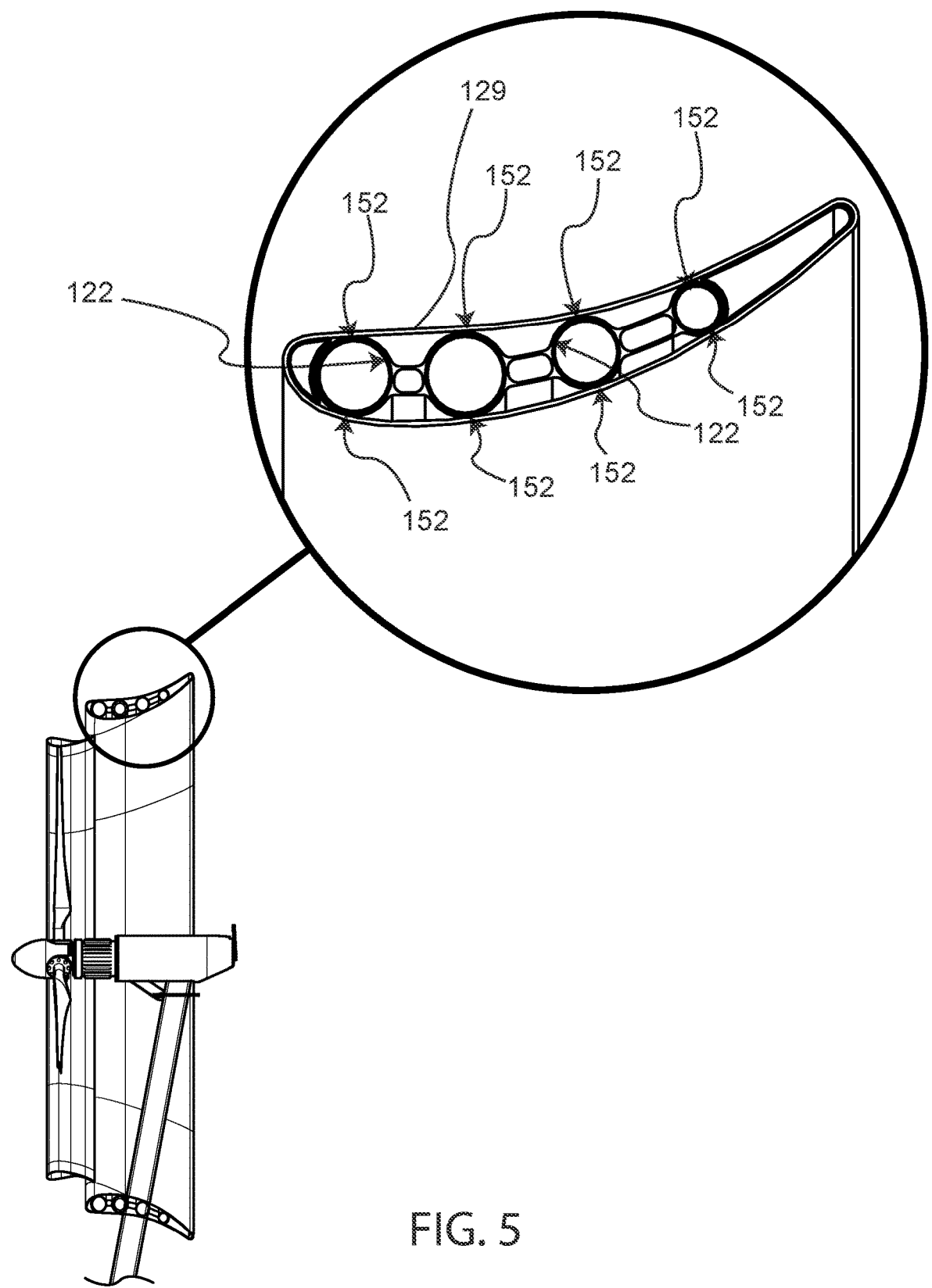
FIG. 5 is a perspective view of internal components thereof.

FIG. 2 and FIG. 3 illustrate an internal structure 128 of the ejector 114 comprising at least one inflated textile structure 122 engaged with an array of ribs 124. Ribs 124 are arrayed about the annular airfoil form and reside along the chord line of the airfoil. Ribs 124 may be said to be arrayed in a chordwise direction. FIG. 4 illustrates in detail an outer shell 129 covering the internal structure, comprising annular inflated textile members 122 and ribs 124. FIG. 4 shows a rib 124 separated from the assembly in a partially exploded, detail view. The rib 124 are engaged with outer shell 129 at tangent points 152 (FIG. 5), stretching the outer shell into a ringed airfoil contour over the rib 124 (FIG. 4).

Figure 6:
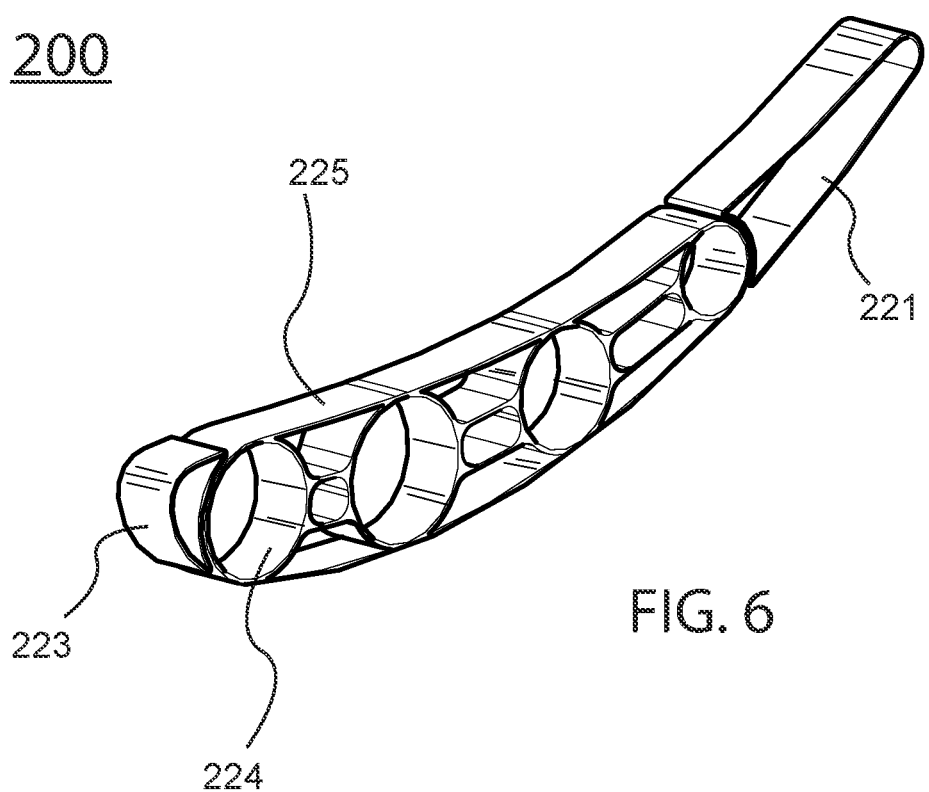
FIG. 6 is a detail view of an iteration of a component thereof.
Figure 7:
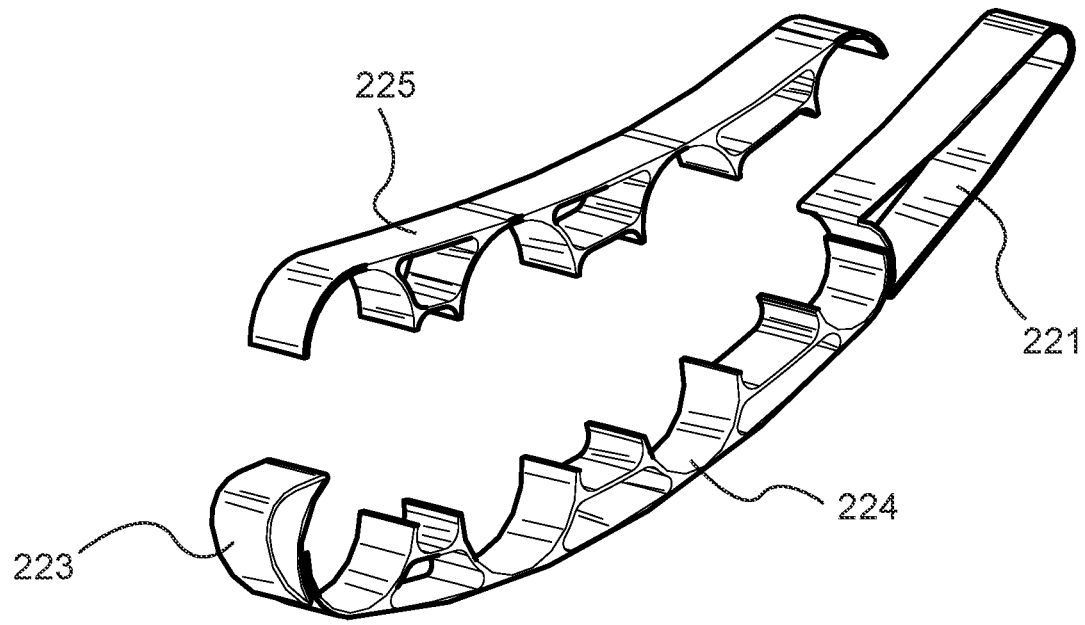
FIG. 7 is an exploded view of an iteration of a component thereof.

In some embodiments, ribs comprise two segments joined about the annular, inflated textile forms as illustrated in FIG. 6 and FIG. 7. This iteration of the rib consists of lower-rib 224 engaged with a leading-edge rib segment 223 and a trailing-edge rib segment 221. The lower-rib 224, leading-edge rib segment 223 and trailing-edge rib segment 221 are engaged with the upper-rib 225 so as to clamp around the annular inflated textile forms 123 (FIG. 3). The outer perimeter of the combination of the upper-rib 225, lower-rib 224, leading-edge rib segment 223 and trailing-edge rib segment 221 provides a contiguous surface that delineates the airfoil profile.

Figure 8:
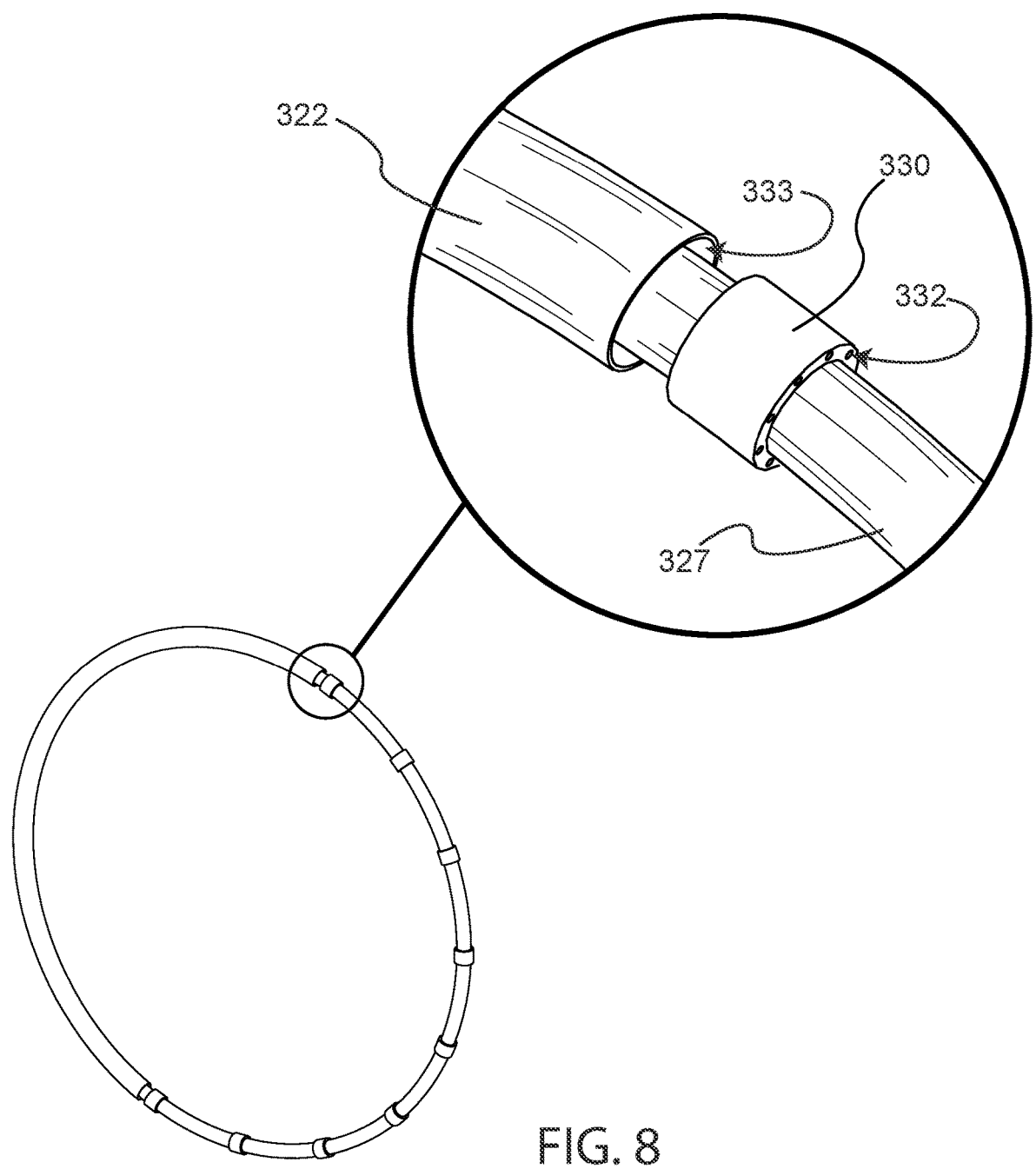
FIG. 8 is a perspective view of internal components thereof.
Figure 9:
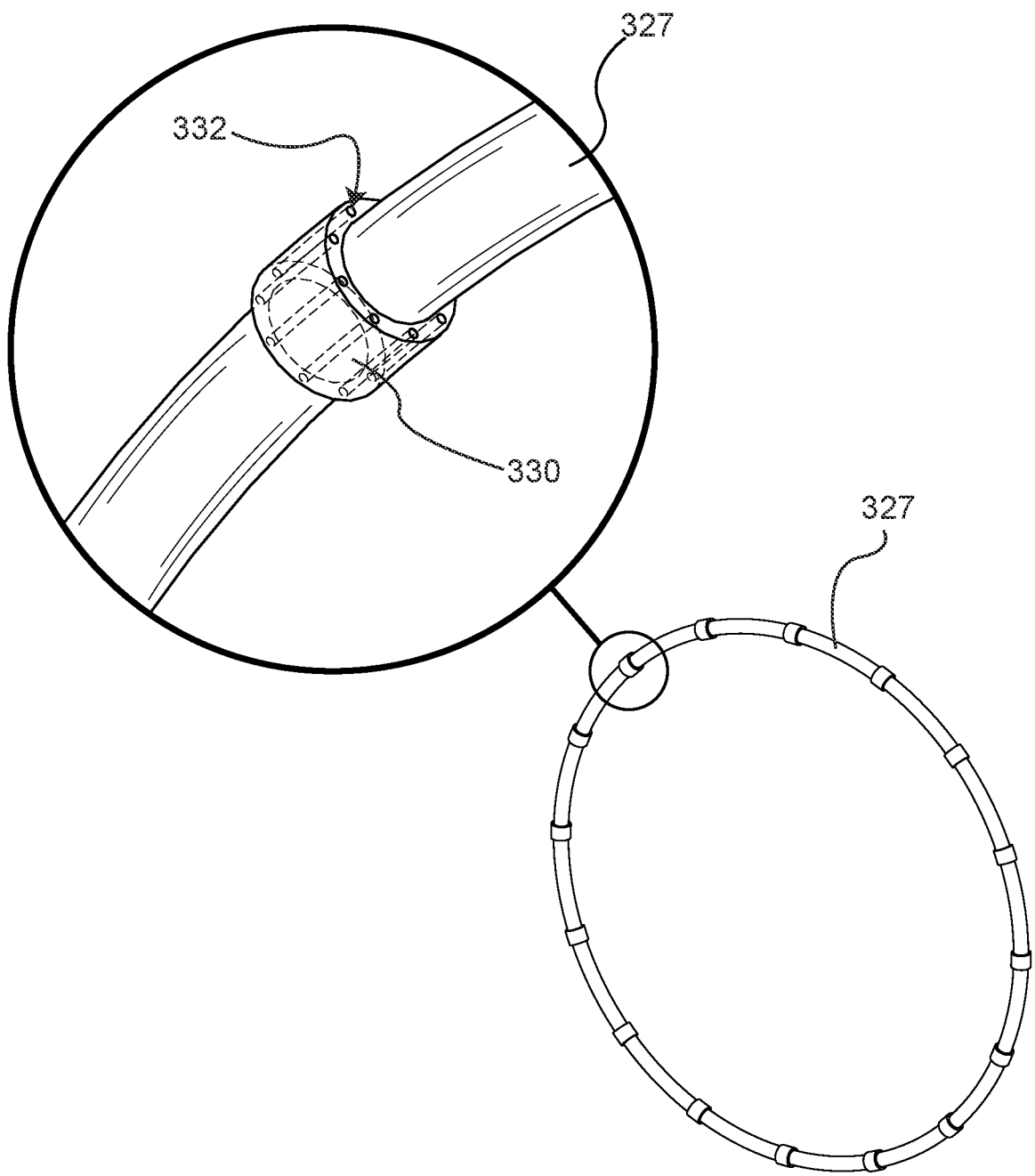
FIG. 9 is a perspective view of internal components thereof.

Referring to FIG. 8, in some embodiments (300), inflated textile forms 322 further comprise inner spacer elements 330 which are engaged with outer, annular inflated textile forms 322 and with inner, annular inflated textile forms 327. The spacer 330 further comprises through-holes 332 that allow fluid communication between annular spaces 333 along the inflated textile forms 327 and 322 (FIG. 8 and FIG. 9). Through-holes 332 are shown as hidden (in broken lines) in the detail of FIG. 9.

Figure 10:
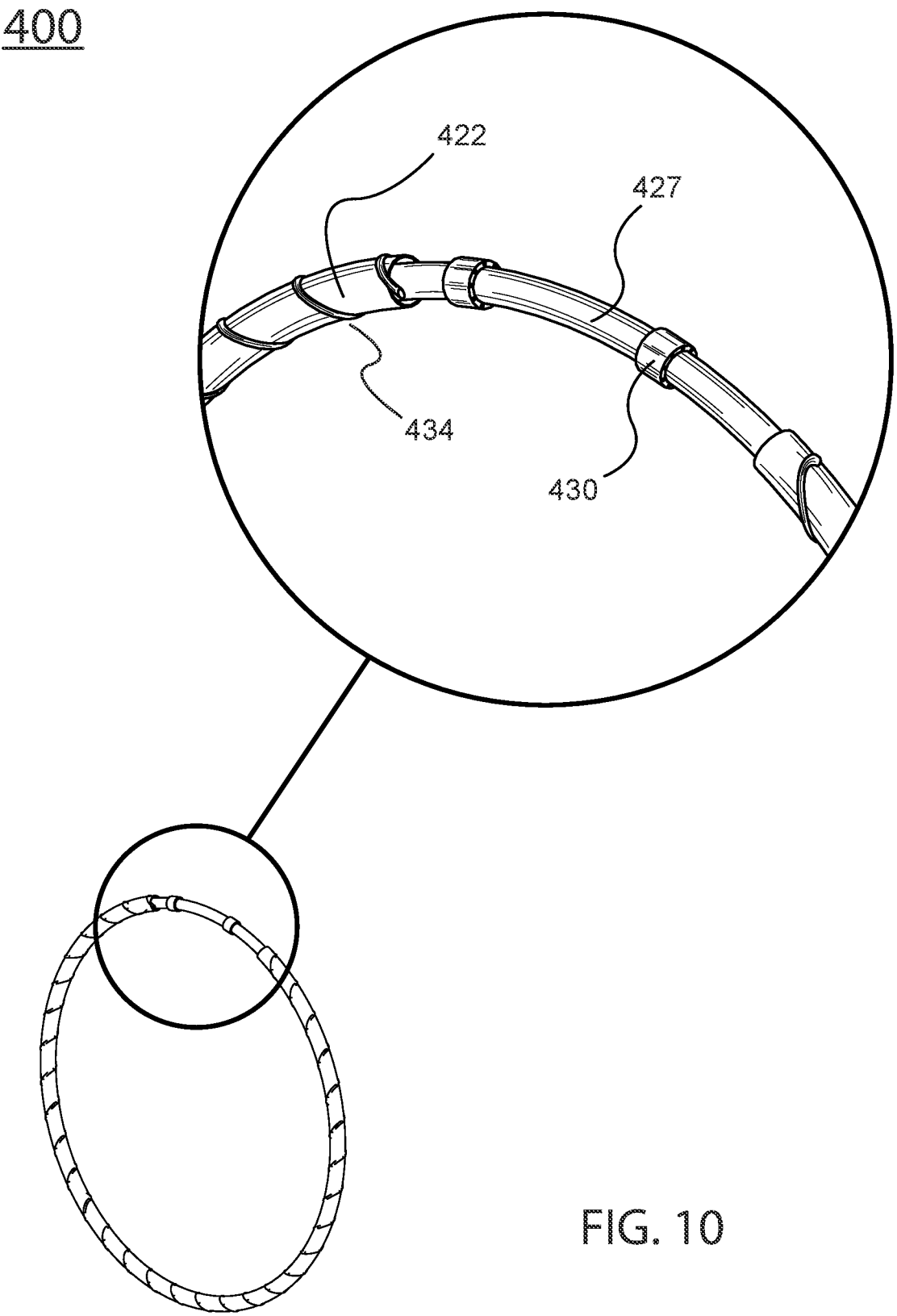
FIG. 10 is a detailed view of components thereof.

An iteration of the embodiment 400 is illustrated in FIG. 10, which shows a rigid, wire-like member 434 engaged with either or both of the annular inflated textile forms 422 or 427, embedded in the textile material and following a series of continuous helical revolutions about the annular inflated textile form(s) 422, 427.

Figure 11:
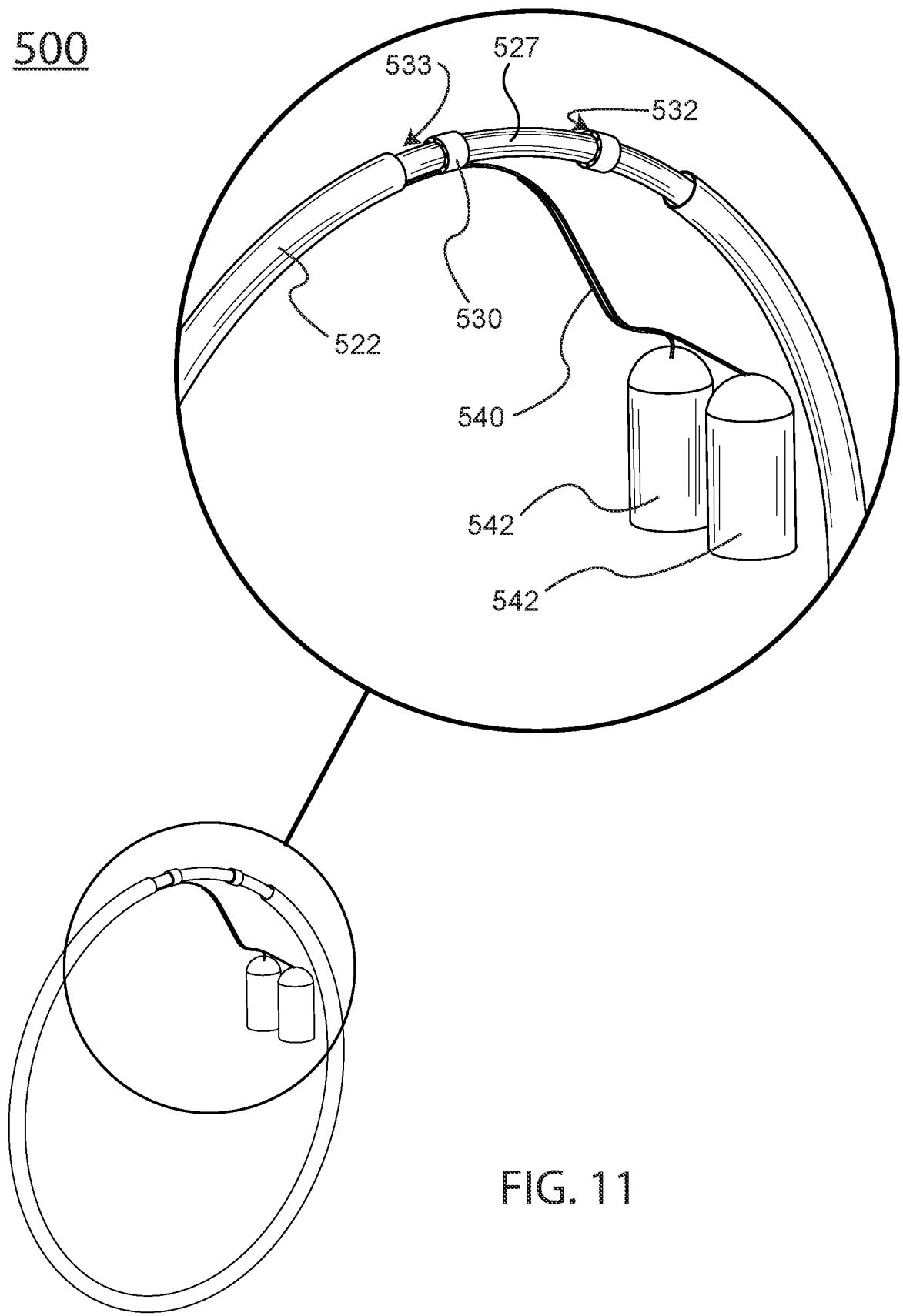
FIG. 11 is an exploded view of an iteration of the embodiment.

An iteration of the embodiment 500 is illustrated in FIG. 11. Annular spaces 533 are infused with an expanding foam or similar composite material comprising at least two components contained separately in containers 542 and mixed upon injection through hoses 540 into annular spaces 533 between outer inflated textile structure 522 and inner textile structure 527 (FIG. 11). Holes 532 in spacers 530 allow expanding foam to infuse through the spacers 530.

Figure 12:
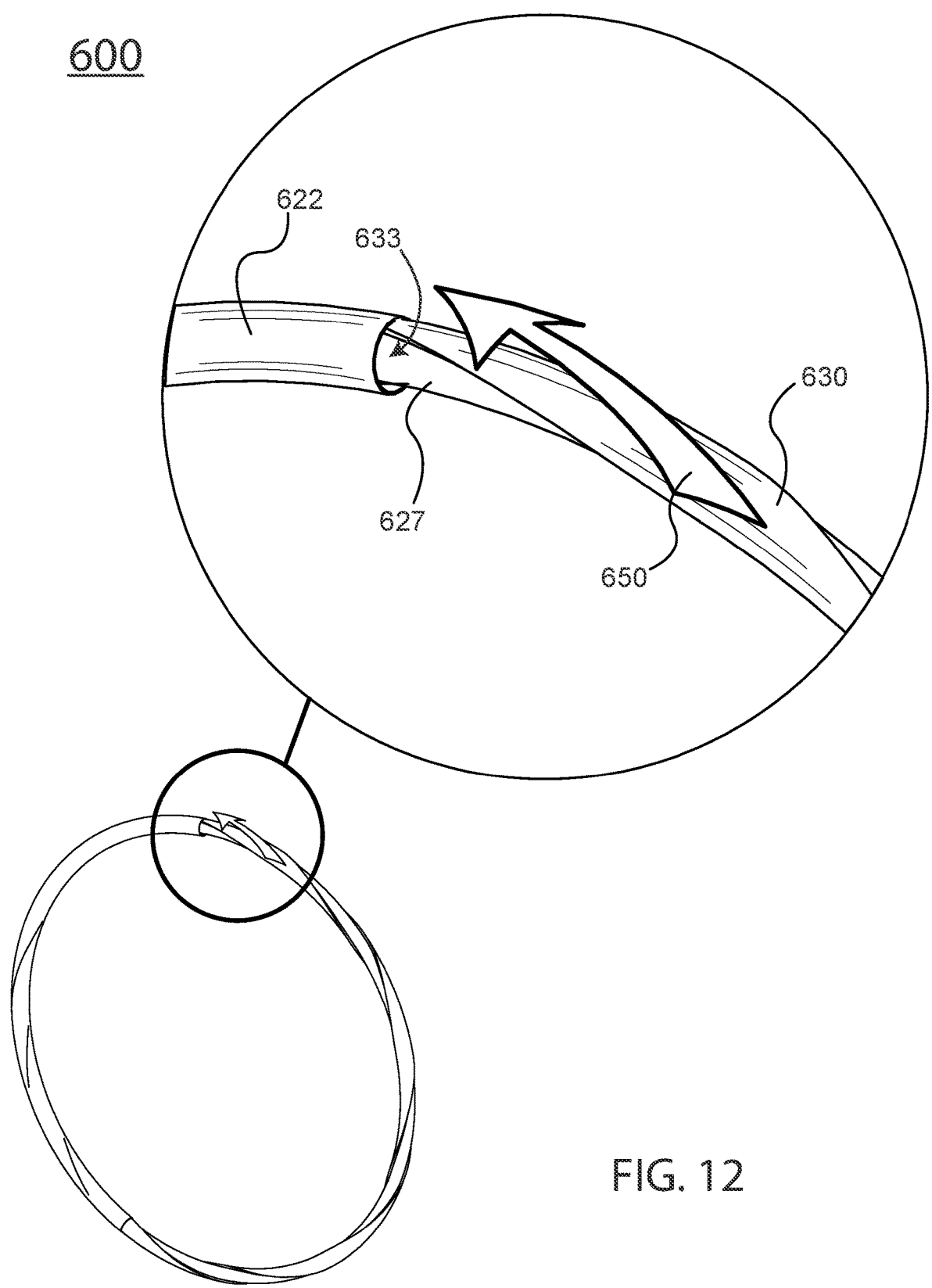
FIG. 12 is a detail view of an iteration of the embodiment.
Figure 13:
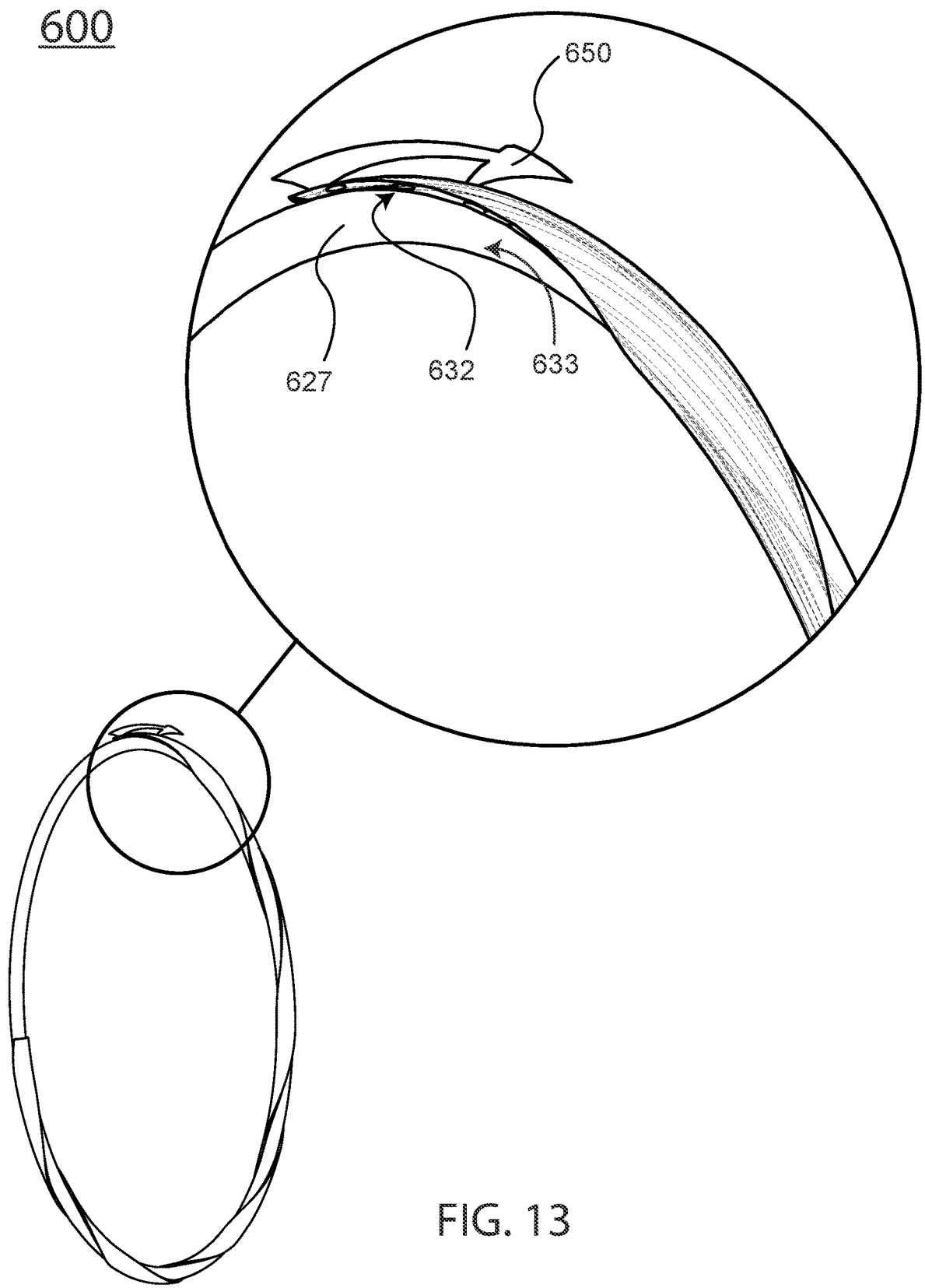
FIG. 13 is a detail view of an iteration of the embodiment.

In FIG. 12 and FIG. 13, another iteration of the embodiment 600 comprises inflated textile forms 622 that further comprise a long form of rectangular cross section, wrapped along a helical path, engaged with the outer surface of the inner inflated textile form 627 and with the inner surface of the outer inflated textile form 622, denoted by arrow 650 (FIG. 12). Through-holes 632 in spacer material allow for fluid communication between spaces 633 that lie between the inner inflated textile form 627 and the outer inflated textile form 622 (FIG. 13).

The invention claimed is:

1. A ringed airfoil comprising:
at least one inflated annular tube fixedly engaged with a plurality of ribs; and
said ribs arrayed annularly in a chordwise direction about said ringed airfoil; and
a membrane surface covering said at least one inflated annular tube and said plurality of ribs.

2. The ringed airfoil of claim 1 wherein;
said membrane surface is fixedly engaged with said at least one inflated annular tube where an airfoil cross section meets an array of tangent points along said at least one inflated annular tube.

3. The ringed airfoil of claim 1 wherein:
said at least one inflated annular tube is of a textile material.

4. The ringed airfoil of claim 3 wherein:
said textile material is impregnated with a polymer.

5. The ringed airfoil of claim 1, said ribs further comprising:
a lower-rib portion fixedly engaged with an inner portion of said at least one inflated annular tube; and
an upper-rib portion fixedly engaged with said lower-rib portion and fixedly engaged with an outer portion of said at least one inflated annular tube; wherein said upper-rib portion and said lower-rib portion make up a chordwise profile of an airfoil over which said membrane is fixedly engaged.

6. The ringed airfoil of claim 5, said ribs further comprising:
a leading-edge portion fixedly engaged with said lower-rib portion and said upper-rib portion; and
a trailing-edge portion fixedly engaged with said lower-rib portion and said upper-rib portion; wherein
said lower-rib portion, said upper-rib portion, said leading-edge portion and said trailing-edge portion make up a chordwise profile of an airfoil over which said membrane is fixedly engaged.

7. A ringed airfoil comprising:
at least a first inflated annular tube; and
at least a second inflated annular tube coaxial and surrounding said at least a first inflated annular tube; and
said at least a second inflated annular tube fixedly engaged with a plurality of ribs; and
said ribs arrayed annularly in a chordwise direction about said ringed airfoil; and
a membrane surface covering said at least a second inflated annular tube and said plurality of ribs.

8. The ringed airfoil of claim 7 further comprising:
a plurality of cylindrical spacers each having a circular cross section, and each having an inner surface and an outer surface; and
said each inner surface engaged with said at least a first inflated annular tube; and
said each outer surface engaged with said at least a second inflated annular tube.

9. The ringed airfoil of claim 8 further comprising:
a plurality of through holes passing through each of said plurality of cylindrical spacers; wherein
said plurality of holes allows for fluid communication between said cylindrical spacers, within said at least a second inflated annular tube.

10. The ringed airfoil of claim 8 further comprising:
at least one fibrous member engaged in a helical pattern with said at least a first inflated annular tube.

11. The ringed airfoil of claim 10 further comprising:
at least one fibrous member engaged in a helical pattern with said at least a second inflated annular tube.

12. The ringed airfoil of claim 8 further comprising:
polymer foam occupying the space between said at least a first inflated annular tube and said at least a second inflated annular tube.

13. The ringed airfoil of claim 7 further comprising:
a substantially flat material having a rectangular cross section wrapped in a helical pattern about said at least a first inflated annular tube.

14. The ringed airfoil of claim 13 wherein;
through holes in said substantially flat material allow for annular fluid communication about a space between said at least a first annular tube and said at least a second annular tube.

* * * * *